UNITED STATES PATENT OFFICE.

JEAN P. PRAT AND JULES P. LAROCHE, OF BORDEAUX, FRANCE.

EXTRACTING NICKEL FROM ORES.

SPECIFICATION forming part of Letters Patent No. 276,074, dated April 17, 1883.

Application filed March 8, 1878. Patented in France September 20, 1877, No. 120,299; in Belgium November 22, 1877, No. 43,597, and in Germany April 16, 1878, No. 6,291.

*To all whom it may concern:*

Be it known that we, JEAN PIERRE PRAT and JULES PETIT LAROCHE, of Bordeaux, in the Republic of France, have invented certain new and useful Improvements in Extracting Nickel from its Ores; and we hereby declare that the following is a full, clear, and exact description of the same.

Our invention relates to the extracting of nickel from its ore by the use of sulphuric or equivalent acid, and the subsequent precipitation of the dissolved nickel by oxalic acid, and the treatment of the oxalate of nickel thus formed with caustic soda, whereby the nickel is obtained in the form of oxide, and the oxalic acid obtained from the oxalate of soda by any suitable process of regeneration, to be reused in subsequent operations.

In carrying out our process, we pour a given weight of concentrated sulphuric acid, from 56° to 66° Baumé, into a suitable vessel, of granite. Into this we then introduce a similar quantity of pulverized nickel ore, and we then agitate the mixture, so that all the particles of ore are brought in contact and thoroughly impregnated with the acid. A gradual heating of the mixture takes place after two or three minutes, and it soon commences to thicken. From that moment a rapid and powerful reaction sets in, the temperature increases, and an abundant evaporation is produced. In a short time—perhaps half an hour—the mixture assumes a greenish tint and solidifies. The termination of the reaction is indicated by the cessation of evaporation, at which time the hydrosilicates are perfectly separated, the nickel and the other metal being entirely combined with the sulphuric acid. The resultant product of the process thus far described is divided into small fragments and thrown into water maintained by any suitable means at the boiling-point, until the entire solution of the mass is effected. It is then allowed to stand, for the purpose of precipitating the insoluble silicates, while the green sulphate solution is carefully decanted. The silicious precipitate remaining is then properly washed, the waters of this washing being used for the purpose of dissolving a fresh quantity of the solid mass resulting from the first step of the process. After this washing the residue should be exclusively silicious, with the exception of a very small quantity of sulphate of lime which may be retained. The green sulphate solution freed from the silicious matter, as described, is now submitted to the following treatment for the extraction of the nickel contained therein: A given quantity of the sulphate-of-nickel solution is placed in a suitable vessel, and to it is added a quantity chemically equivalent to the weight of the nickel in the solution of oxalic acid. The resultant mixture is heated to a boiling-point, and this degree of heat maintained for a length of time to convert the nickel sulphate into oxalate. The result of this boiling is to thicken the liquid and cause it to assume a greenish color, and which being allowed to stand, the oxalate of nickel is precipitated in the shape of an insoluble paste of a light greenish-blue color. This precipitate of nickel is then separated from the supernatant liquid and then washed until, by tests, it is shown that no trace of sulphuric acid remains in the water. Thus purified and dried, it is in a proper state to yield metallic nickel. This could be accomplished by fusing at a sufficiently high temperature; but such process would cause the loss of the oxalic acid, which is so expensive that some other mode is necessarily employed. The oxalic acid contained in the paste is therefore extracted by the use of caustic soda. The proportion of such soda is chemically equivalent to that of the oxalate of nickel. This mixture is then subjected to a moderate degree of heat until the oxalate of nickel is entirely transformed into oxide. The oxalic acid may be obtained from the oxalate of soda in any well-known way.

The proportions may be varied in some instances for different kinds of nickel ores; but such variation in proportion would be well known to those skilled in the art.

We are aware that it is old to use sulphuric acid in the extraction of nickel from ores, and that it is also old to use oxalic acid as a precipitant in such process; and we do not claim this, broadly, our invention being limited to a peculiar process whereby the oxide of nickel is obtained, while oxalate of soda resulting from the process may be regenerated to produce oxalic acid for subsequent use.

Having thus described our invention, what we claim is—

In the extraction of nickel from its ores, the process which consists in decomposing the ore by means of sulphuric acid, dissolving the sulphate of nickel thus formed in boiling water, decanting the solution and adding oxalic acid, heating the resulting oxalate of nickel with caustic soda, and finally separating the oxide of nickel from the oxalate.

In testimony whereof we have signed our names to this specification in the presence of two subscribing witnesses.

JEAN PIERRE PRAT.
JULES PETIT LAROCHE.

Witnesses:
N. PAILLERÉ,
CH. F. THIRION.